(12) United States Patent
Baumer et al.

(10) Patent No.: US 10,800,272 B2
(45) Date of Patent: Oct. 13, 2020

(54) GROUND PAD MODULE FOR CHARGING A POWER-DRIVEN VEHICLE

(71) Applicant: Daimler AG, Stuttgart (DE)

(72) Inventors: Timo Baumer, Stuttgart (DE); Bjoern Bergfelder, Troisdorf (DE)

(73) Assignee: Daimler AG, Stuttgart (DE)

(*) Notice: Subject to any disclaimer, the term of this patent is extended or adjusted under 35 U.S.C. 154(b) by 356 days.

(21) Appl. No.: 15/755,478

(22) PCT Filed: Jun. 18, 2016

(86) PCT No.: PCT/EP2016/001040
§ 371 (c)(1),
(2) Date: Feb. 26, 2018

(87) PCT Pub. No.: WO2017/032434
PCT Pub. Date: Mar. 2, 2017

(65) Prior Publication Data
US 2018/0251035 A1    Sep. 6, 2018

(30) Foreign Application Priority Data
Aug. 27, 2015  (DE) .................. 10 2015 011 285

(51) Int. Cl.
*H02J 7/00* (2006.01)
*B60L 53/12* (2019.01)
(Continued)

(52) U.S. Cl.
CPC ............ *B60L 53/12* (2019.02); *B60L 11/182* (2013.01); *H01F 27/085* (2013.01); *H01F 38/14* (2013.01);
(Continued)

(58) Field of Classification Search
CPC ................................. B60L 11/182; B60L 53/12
(Continued)

(56) References Cited

U.S. PATENT DOCUMENTS

| 2007/0056302 A1* | 3/2007 | Otake | A01J 9/04 62/243 |
|---|---|---|---|
| 2010/0060016 A1* | 3/2010 | Hunter | F03G 7/08 290/1 R |

(Continued)

FOREIGN PATENT DOCUMENTS

| JP | 2013-147142 A | 8/2013 |
|---|---|---|
| WO | WO 2011/006884 A2 | 1/2011 |

OTHER PUBLICATIONS

PCT/EP2016/001040; International Search Report dated Sep. 15, 2016 (Two (2) pages).

*Primary Examiner* — Yalkew Fantu
(74) *Attorney, Agent, or Firm* — Crowell & Moring LLP

(57) ABSTRACT

A ground pad module for charging a power-driven vehicle is designed to be arranged on an underground accessible to the vehicle. The ground pad module includes a fan unit arranged within the ground pad module and configured to cool at least one electrical and/or electronic assembly arranged within the ground pad module by an air flow that can be supplied to the ground pad module from an exterior area. An inlet channel of the air flow is designed such that if the ground pad module is arranged as intended, water penetrating through an inlet opening of the inlet channel must overcome at least one step in a component of a flow direction of the water before it reaches the fan unit and/or the assembly with the component facing a direction opposite to the force of gravity.

7 Claims, 2 Drawing Sheets

(51) Int. Cl.
*H01F 38/14* (2006.01)
*B60L 11/18* (2006.01)
*H02J 50/10* (2016.01)
*H01F 27/08* (2006.01)

(52) U.S. Cl.
CPC ........... H02J 50/10 (2016.02); *Y02T 10/7005* (2013.01); *Y02T 10/7072* (2013.01); *Y02T 90/122* (2013.01); *Y02T 90/14* (2013.01)

(58) Field of Classification Search
USPC ........................................................ 320/107
See application file for complete search history.

(56) References Cited

U.S. PATENT DOCUMENTS

| | | | |
|---|---|---|---|
| 2014/0097671 A1 | 4/2014 | Nakamura et al. | |
| 2015/0048752 A1* | 2/2015 | Van Den Brink | H01F 38/14 |
| | | | 315/246 |
| 2015/0278038 A1* | 10/2015 | Halker | G06F 11/20 |
| | | | 714/3 |
| 2018/0038048 A1* | 2/2018 | Medoff | C07C 31/12 |

* cited by examiner

# GROUND PAD MODULE FOR CHARGING A POWER-DRIVEN VEHICLE

BACKGROUND AND SUMMARY OF THE INVENTION

The invention refers to a ground pad module for charging a power-driven vehicle.

Ground pad modules (GPM) are subject to requirements both regarding tightness to moisture, which is indispensable due to the electronic components used, and regarding a cooling feature with a specified capacity to extract the thermal energy arising in the ground pad module due to the dissipation power to ensure that the electronic components are operated within the permitted temperature range. One possible cooling design includes a forced-ventilation cooling system including cooling ribs and a fan, with their structural design competing with the required tightness due to the open-air exchange.

US 2014/0097671 A1 discloses a generic ground pad module that is designed as a circular energy transmission unit with a primary coil and a capacitor. An air channel is arranged between a coil carrier element and a guiding wall, through which the air coming from a fan may pass. Part of the air blown into the energy transmission unit by the fan flows through the air channel, which results in a primary coil on the side of the energy transmission unit being cooled, which is mounted on an exterior circumferential surface of the coil carrier element.

Therefore, the task of the present invention is to provide a ground pad module for charging a power-driven vehicle that provides enhanced protection against the ingress of splash or flood water and simultaneously facilitates active cooling of electrical and/or electronic assemblies arranged within the ground pad module.

The invention assumes a ground pad module for charging a power-driven vehicle, with the ground pad module designed to be arranged on an underground accessible by the power-driven vehicle, comprising a fan unit arranged within the ground pad module that is configured to cool at least one electrical and/or electronic assembly arranged within the ground pad module by means of an air flow that may be supplied to the ground pad module from an exterior area. According to the invention, an inlet channel of the air flow is designed such that, if the ground pad module is arranged as intended, water penetrating through an inlet opening of the inlet channel must at least overcome one step in a component of a flow direction of the water before it reaches the fan unit and/or the assembly, with the component facing a direction opposite to the force of gravity. Consequently, a forced-ventilation cooling can be implemented for a ground pad module lying on the accessible underground (ground), comprising at least one electrical and/or electronic assembly arranged within the ground pad module while simultaneously providing a tightness to the ingress of water; a tightness to floor and/or splash water can be achieved in this regard in particular. Due to electronic assemblies being arranged within the ground pad module, it is possible to do without a unit to be arranged separately, e.g., a charger mounted to a wall, and to, instead, integrate all electronic assemblies that are required for charging the power-driven vehicle into the ground pad module.

In an advantageous further development, the height of the step to be overcome is at least 40 percent of the design height of the ground pad module, which is constituted by the space between a bottom side facing toward the accessible underground and a top opposing the above and facing away from the accessible underground, preferably at least 60 percent, particularly at least 75 percent. This way, it can be ensured that splash or flood water must, working against the force of gravity, overcome a height that can be specified before it can penetrate the ground pad module to a deeper extent.

In another advantageous embodiment, a diaphragm is arranged upstream and/or downstream of the step in an opening in the housing bottom that, if the ground pad module is arranged as intended, is facing toward the underground, with the diaphragm being designed to discharge any water which penetrated the inlet channel and is not able to flow out by itself through the inlet opening, through the opening in the housing bottom and to prevent any ingress of water through the opening in the housing bottom. Such a design specifically facilitates a multi-step barrier against the ingress of water without a larger amount of water accumulating inside the ground pad module on a permanent basis.

Preferably, the ground pad module is designed for wirelessly transmitting energy to the power-driven vehicle, particularly for transmitting the energy inductively.

In another advantageous embodiment, the inlet channel has a U-shaped route in the area upstream and/or downstream of the step, with particularly two U-shaped segments following one another and arranged opposite to one another in order to form a wave-shaped route. Therefore, a multi-step barrier against the ingress of water can be implemented in a particularly advantageous manner, with kinetic and/or potential energy being removed from the water until the water is collected in a dedicated collection area, which can be drained by the diaphragm already described.

In another advantageous embodiment, the ground pad module has an outlet channel with an outlet opening in order to divert the air flow to the exterior area, with the outlet channel being designed such that it is symmetrical with the inlet channel. In this, it may be provided that the air flow, passing the structural elements arranged in the inlet channel in a first order in the flow direction starting from the inlet opening, then flows past the fan unit and the assembly and then flows through an outlet channel up to the outlet opening, with—while flowing through the outlet channel—the same structural arrangements designed to prevent any ingress of water being flown through in an order that is opposite to the first order.

Therefore, a symmetric design of the outlet channel regarding the inlet channel must not necessarily be understood as a geometrically exact mirror image of dimensions, but rather as a functional sequence of the individual structural features of the inlet channel and the outlet channel.

Additional advantages, features, and characteristics of the invention become apparent by the following description of preferred exemplary embodiments, as well as by the drawings. The features and combinations of features mentioned in the foregoing description as well as the features and combinations of features mentioned in the following description of the figures and/or illustrated alone in the figures are not only usable in the combination specified in each case, but also in other combinations or alone, without deviating from the spirit of the invention.

DETAILED DESCRIPTION OF THE DRAWINGS

Figure 1:
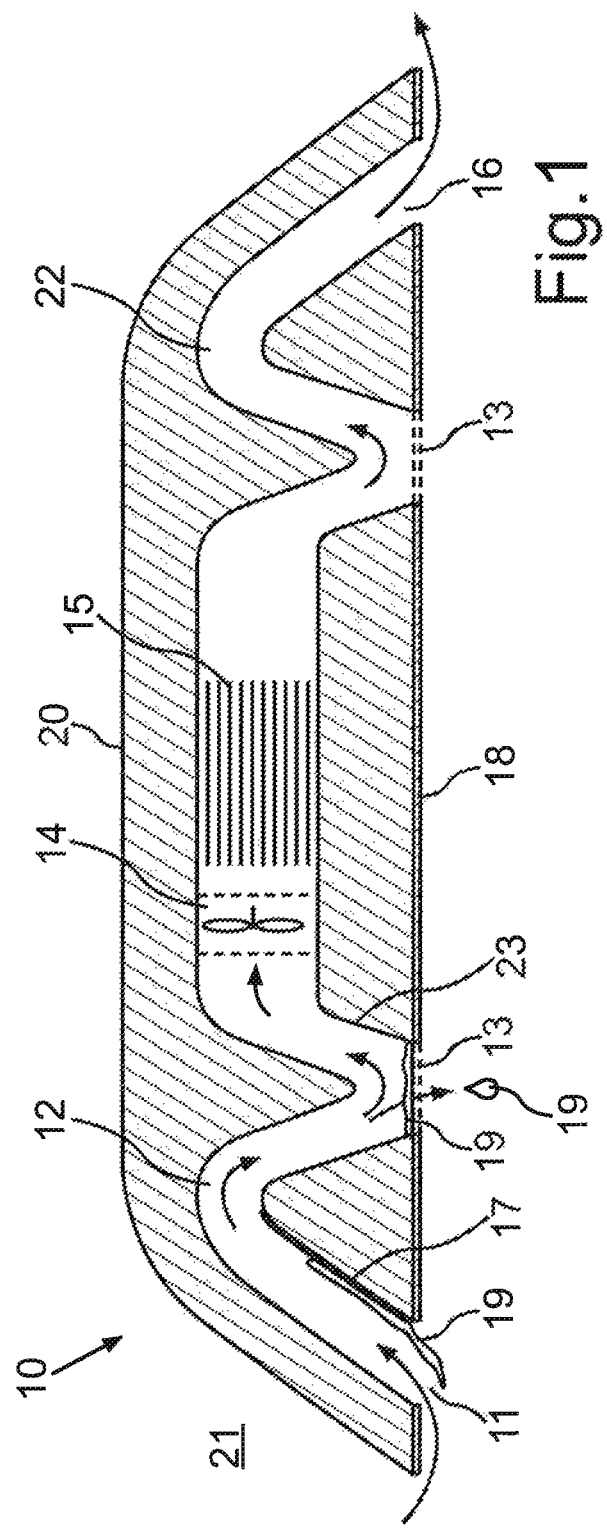
FIG. 1 illustrates a preferred embodiment of a ground pad module according to the invention, including air channel and forced-ventilation cooling, in a simplified schematic representation.

Identical, similar, and/or analog objects have the same reference numerals.

FIG. 1 illustrates a preferred embodiment of a ground pad module 10 according to the invention in a lateral cross-sectional view. The ground pad module 10 has a bottom 18 facing toward an accessible underground. Between the bottom 18 and a top 20 that is opposite of the above and facing away from the accessible underground, a fan unit 14 and an electronic assembly 15 are arranged. An air flow may flow through the fan unit 14 and the electronic assembly 15, with the air flow being supplied by an inlet channel 12. The air flow that can be supplied from an exterior area 21 through an inlet opening 11 enters the inlet channel 12 by initially being guided over a step 17. Possibly penetrating water 19 can be retained by the step 17. If the ingress velocity of the water 19 is so high that it can overcome the step 17, it can be provided to arrange a diaphragm in an area downstream of step 17, with the bottom 18 of this area having an opening that discharges any water 19 that penetrated through the opening in the bottom 18 and preventing any ingress of water 19 through the opening in the bottom 18 in the opposite direction.

An outlet channel 22 may be designed symmetrically regarding the inlet channel 12 that leads to an outlet opening 16. An auxiliary step 23 can prevent that water 19, which has overcome step 17 and accumulates on the diaphragm 13, can continue to flow to the fan unit 14 and the assembly 15. The design of the outlet channel 22 is symmetrical to the inlet channel 12; the information provided on the water 19, the step 17, as well as the auxiliary step 23 is thus also applicable to the side of the outlet channel 22. The ground pad module 10 can be of a round or rectangular design, particularly square when looking in the direction of the top 20 or bottom 18; the inlet channel 12 and the outlet channel 22 can be of a circular (when looking in the direction of the bottom 18 or the top 20) and/or tubular (when looking in the flow direction of the air flow) design.

Supply air enters the air channel through the inlet opening 11, with the route of the air channel being provided by the inlet channel 12 upstream of the fan unit 14. The geometry (U-shape) of the air channel prevents any ingress of water 19 to a fan/cooling module in the form of the fan unit 14. The diaphragm 13 can separate water 19 present in the inlet channel 12, with it only being possible to discharge moisture to the outside in the direction of the exterior area 21. The fan unit 14 transports the cooling air through the air channel, with the further route of the air channel being provided by the outlet channel 22 downstream of the assembly 15. Actually, cooling of the electronics is realized by the air flowing past cooling ribs of the assembly 15. The water separation feature is mirrored at the outlet opening 16 or the outlet channel 22.

Figure 2:
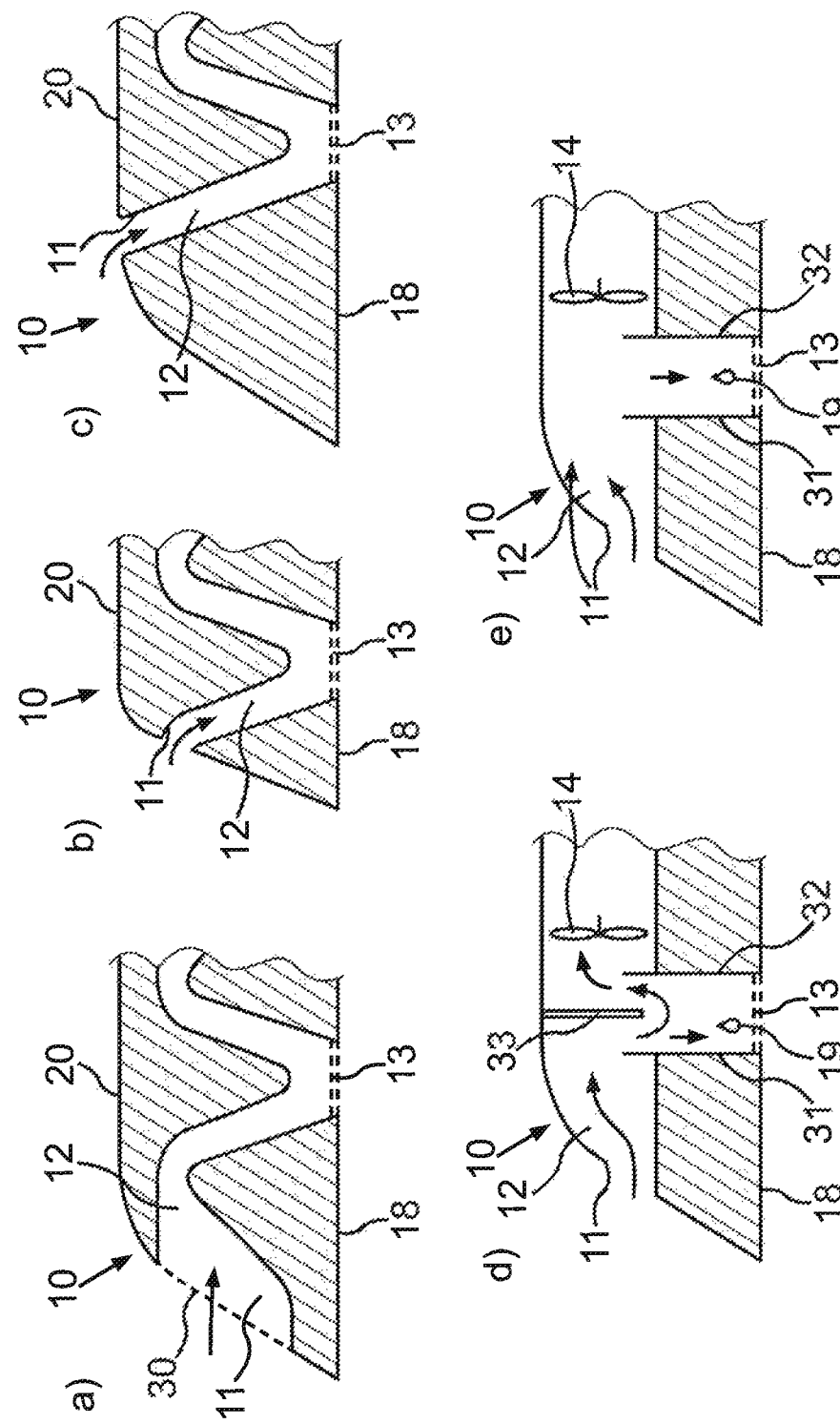
FIG. 2 illustrates diverse air inlet and air duct variants according to additional preferred exemplary embodiments of the ground pad module according to the invention.

The air inlet and air duct variants a) to e) presented in FIG. 2 are explained in more detail below.

Variant a) shows an inlet opening 11 that is arranged laterally on the ground pad module 10 and that covers a large part of the design height between the bottom 18 and the top 20, with the inlet opening 11 being covered by a protective grid 30. For example, the protective grid 30 can serve to decelerate water that hits the grid and thereby to prevent the water 19 from penetrating deeper into the inlet channel 12. An opening in the bottom 18 contains the diaphragm 13 already known from FIG. 1.

According to variant b), the inlet opening 11 is arranged laterally in the upper area of the ground pad module 10 and the inlet channel has a V-shaped or U-shaped route, with the diaphragm 13 being arranged at the bottom of the arch-shaped route of the inlet channel 12.

According to variant c), the inlet opening 11 is arranged at the top 20 of the ground pad module 10, resulting in a maximum possible height of the step to be overcome for laterally flowing water in an advantageous manner, namely the distance between the bottom 18 and the top 20.

Variant d) illustrates the inlet opening 11 at half the height of the ground pad module 10, with the air flow flowing through the inlet channel 12 over a collecting vessel that is designed between a first wall 31 and a second wall 32 to separate water 19 carried along. The diaphragm 13 is arranged at the bottom of this collecting vessel in a known manner. In order to prevent the water 19 from being forwarded directly to the fan unit 14, there is a third wall 33 extending from the upper area of the inlet channel 12, starting from the top 20, down to the inside of the collecting vessel between the first wall 31 and the second wall 32. Therefore, the air flow is initially diverted to the bottom and then back to the top and water 19 carried along is directed efficiently into the collecting vessel between the first wall 31 and the second wall 32. Thus, even larger amounts of liquid can be collected advantageously that have entered through the inlet opening 11.

Variant e) is largely identical to variant d), the only difference being that the third wall 33 is not applicable, so that the air flow can reach the fan unit 14 in a straight direction through the inlet channel 12. If the distance between the first wall 31 and the second wall 32 is specified accordingly, water 19 that penetrated can be directed into the collecting vessel between the first wall 31 and the second wall 32 by the force of gravity alone.

Of course, the variants a) to e) shown are applicable in an analog manner to the corresponding outlet channel 22 with the outlet opening 16. Likewise, any combinations of the variants shown may be provided at the inlet side and the outlet side.

The exemplary embodiments only serve to explain the invention and do not restrict the invention. This way, the shapes of the inlet channel 12 and/or the outlet channel 22, as well as their sequence and the arrangement of diaphragms 13 in the bottom 18, can be as required without deviating from the spirit of the invention.

Thus, the foregoing shows how a splash and flood water protection for ground pad modules can be implemented with a forced-ventilation cooling, particularly for inductive charging.

The invention claimed is:

1. A ground pad module for charging a power-driven vehicle, comprising:
   a fan unit disposed within the ground pad module, wherein at least one assembly disposed within the ground pad module is coolable by the fan unit by an air flow that is supplied to the ground pad module from an exterior area;
   an inlet channel for the air flow, wherein, if the ground pad module is arranged as intended, water penetrating through an inlet opening of the inlet channel must at least overcome a step in a component of a flow direction of the water before the water reaches the fan unit and the assembly, wherein the component faces a direction opposite to a force of gravity; and a diaphragm disposed downstream of the step and in an opening in a housing bottom of the ground pad module, wherein, if the ground pad module is arranged as intended, the diaphragm is facing toward an underground and wherein the diaphragm discharges any water, which penetrates the inlet channel and is not able to flow out through the inlet opening, through the opening in the housing bottom and prevents ingress of water through the opening in the housing bottom.

2. The ground pad module according to claim 1, wherein a height of the step is at least 40 percent of a height of the ground pad module which is defined by a space between a bottom side of the ground pad module facing toward the underground and a top of the ground pad module that opposes the bottom side and faces away from the underground.

3. The ground pad module according to claim 1, wherein energy is wirelessly transmittable by the ground pad module to the power-driven vehicle.

4. The ground pad module according to claim 3, wherein the energy is inductively wirelessly transmittable.

5. The ground pad module according to claim 1, wherein the inlet channel has a U-shaped route in an area upstream and/or downstream of the step.

6. The ground pad module according to claim 1, wherein the inlet channel has two U-shaped segments following one another that are disposed opposite to one another and form a wave-shaped route.

7. The ground pad module according to claim 1, wherein the ground pad module has an outlet channel with an outlet opening, wherein the air flow is divertable to the exterior area via the outlet channel and the outlet opening, and wherein the outlet channel is symmetrical with the inlet channel.

* * * * *